United States Patent
Jared et al.

(10) Patent No.: US 8,977,784 B2
(45) Date of Patent: Mar. 10, 2015

(54) PORT TEAMING

(75) Inventors: Matthew A. Jared, Hillsboro, OR (US);
Patrick Connor, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1147 days.

(21) Appl. No.: 12/771,638

(22) Filed: Apr. 30, 2010

(65) Prior Publication Data

US 2011/0268111 A1    Nov. 3, 2011

(51) Int. Cl.
| | |
|---|---|
| *G06F 3/00* | (2006.01) |
| *G06F 15/16* | (2006.01) |
| *H04L 29/06* | (2006.01) |
| *H04L 12/891* | (2013.01) |

(52) U.S. Cl.
CPC .............. *H04L 47/41* (2013.01); *Y02B 60/33* (2013.01); *H04L 69/14* (2013.01)
USPC .......................................... 710/15; 709/249

(58) Field of Classification Search
CPC ...................... H04L 47/125; G06F 2206/1012
USPC ........................................................... 710/15
See application file for complete search history.

(56) References Cited

U.S. PATENT DOCUMENTS

| | | | | |
|---|---|---|---|---|
| 5,838,681 | A * | 11/1998 | Bonomi et al. | 370/395.41 |
| 6,661,803 | B1 * | 12/2003 | Choi et al. | 370/413 |
| 6,879,560 | B1 | 4/2005 | Cahn | |
| 6,940,818 | B2 * | 9/2005 | Moran et al. | 370/235.1 |
| 6,973,501 | B1 | 12/2005 | Harris et al. | |
| 7,305,492 | B2 | 12/2007 | Bryers et al. | |
| 7,310,695 | B2 | 12/2007 | Epps et al. | |
| 8,340,111 | B1 * | 12/2012 | Krivitski et al. | 370/419 |
| 2004/0068589 | A1 * | 4/2004 | Witkowski et al. | 709/249 |
| 2005/0232304 | A1 * | 10/2005 | Quigley | 370/486 |
| 2007/0201380 | A1 | 8/2007 | Ma et al. | |
| 2009/0219392 | A1 | 9/2009 | Roskowski | |

FOREIGN PATENT DOCUMENTS

| | | |
|---|---|---|
| WO | 2011137412 A2 | 11/2011 |
| WO | 2011137412 A3 | 11/2011 |

OTHER PUBLICATIONS

"IEEE Standard for Local and metropolitan area networks—Link Aggregation", IEEE Computer Society, Sponsored by the LAN/MAN Standards Committee, IEEE Std 802.1AX™-2008, Nov. 3, 2008, 163 pages.
"Intel® 82580 Quad/Dual Gigabit Ethernet LAN Controller Datasheet", LAN Access Division (LAD), 321027-012EN, Revision: 2.4, Mar. 2010, 710 pages.

(Continued)

*Primary Examiner* — Titus Wong
(74) *Attorney, Agent, or Firm* — Christopher K. Gagne (57) ABSTRACT

An embodiment may include circuitry to be comprised at least in part in a first host, and at least one process to be executed, at least in part, by the circuitry. The circuitry may comprise a first port and a second port. The at least one process may detect, at least in part, a first bandwidth condition of the first port, and may associate, at least in part, in response at least in part to the first bandwidth condition, the first port and the second port with a port team. The second port may have been, prior to being associated, at least in part, with the port team, in a relatively lower power state compared to a relatively higher power state. The second port may be in the relatively higher power state after the second port is associated, at least in part, with the port team.

20 Claims, 5 Drawing Sheets

(56) References Cited

OTHER PUBLICATIONS

"Advanced Network Services Teaming", Last modified on Oct. 12, 2009, Revision 39, 10 pages.
PCT Search Report and Written Opinion of corresponding International Application no. PCT/US2011/034701, filed Apr. 30, 2011; mailing date Jan. 2, 2012; 10 pages.
International Preliminary Report on Patentability and Written Opinion received for PCT Patent Application No. PCT/US2011/034701, mailed on Nov. 15, 2012, 5 pages.
Office Action received for Chinese Patent Application No. 201180016858.1, mailed on Jun. 30, 2014, 12 pages of English Translation and 10 pages of Chinese Office Action.

* cited by examiner

PORT TEAMING

FIELD

This disclosure relates to port teaming.

BACKGROUND

In one conventional arrangement, a computer includes network adapters that have ports that are coupled to a network. In operation, two or more of the ports can be teamed together for purposes of fault tolerance, link aggregation, or load balancing.

Typically, the association of the ports into the teaming relationship, and the parameters of the ports and the teaming relationship are manually, statically configured by a human user of the computer. This inherently limits the ability of the ports and/or team to adapt to changing network conditions without human intervention, and indeed, a significant amount of such intervention may be involved in manual reconfiguration to respond to such changed conditions. This increases the time and expense involved in maintaining and operating the computer and/or network.

Additionally, such changed network conditions may make it no longer desirable to maintain a port in an active operational state in a given team. However, the above limitations of this conventional arrangement may result in the port remaining actively powered up in the team, despite these changed conditions, until such time as the human user reconfigures the team. This may reduce the efficiency and increase the power consumption of the computer and/or network.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
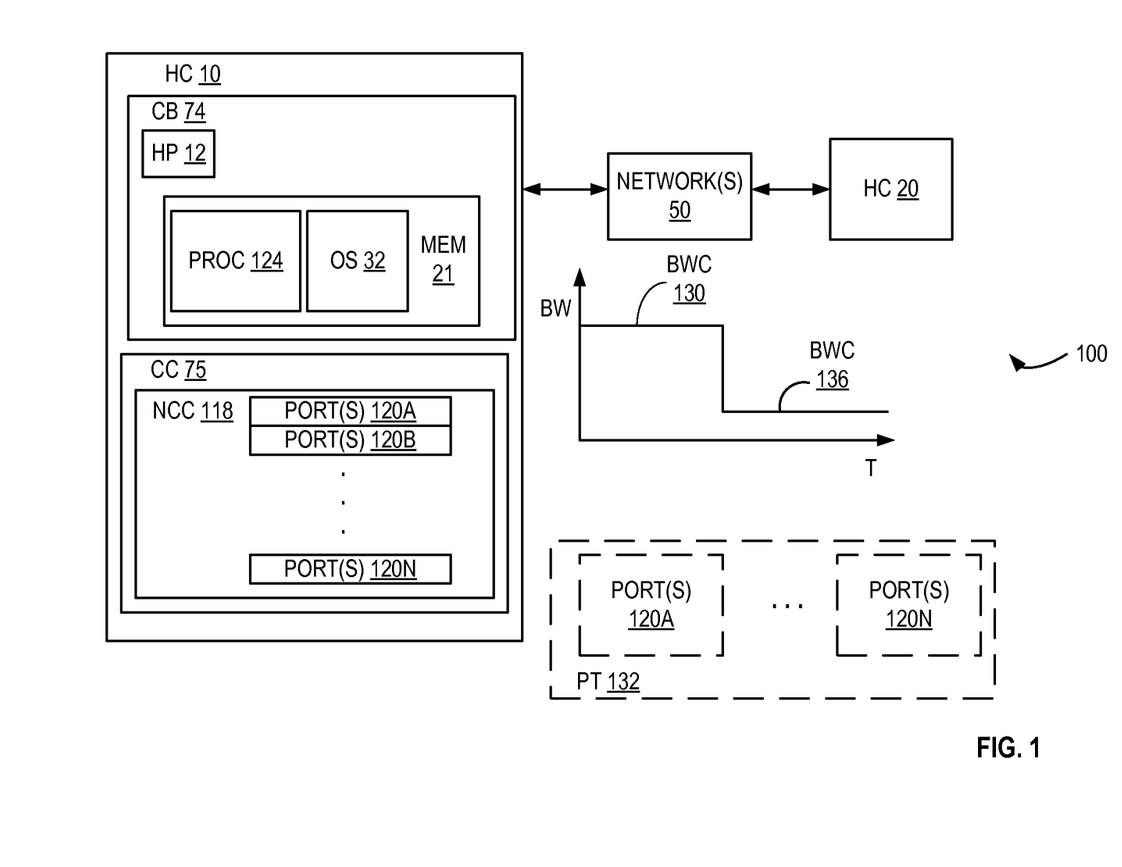
FIG. 1 illustrates a system embodiment.

FIG. 1 illustrates a system embodiment 100. System 100 may include host computers (HC) 10 and 20 that may be communicatively coupled together via one or more wireless and/or wired networks 50. Each of the host computers 10 and 20 may be geographically remote from each other. In this embodiment, the terms "host computer," "host," "server," and "node" may be used interchangeably, and may mean, for example, one or more end stations, smart phones, tablet computers, appliances, intermediate stations, network interfaces, clients, servers, and/or portions thereof. In this embodiment, a "network" or "communication link" may be used interchangeably, and may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an "instruction" may include data and/or one or more commands.

Host computer 10 may comprise circuit board (CB) 74 and circuit card (CC) 75. In this embodiment, CB 74 may comprise, for example, a system motherboard and may be physically and communicatively coupled to CC 75 via a not shown bus connector/slot system. CB 74 may comprise one or more single and/or multi-core host processors (HP) 12 and computer-readable/writable memory 21. Although not shown in the Figures, CB 74 also may comprise one or more chipsets (comprising, e.g., memory and/or input/output controller circuitry). One or more host processors 12 may be communicatively coupled via the one or more chipsets to memory 21 and CC 75.

CC 75 may comprise network and/or input/output (I/O) controller circuitry (NCC) 118. Circuitry 118 may comprise a plurality of ports 120A, 120B, . . . 120N. Ports 120A, 120B, . . . 120N may be communicatively coupled to one or more networks 50. In an embodiment, network and/or I/O controller circuitry may be or comprise circuitry capable of monitoring, facilitating, controlling, permitting, and/or implementing, at least in part, transmission, storage, retrieval, and/or reception, at least in part, of one or more symbols and/or values.

Alternatively or additionally, although not shown in the Figures, some or all of circuitry 118 and/or the functionality and components thereof may be comprised in, for example, CB 74 (e.g., in one or more host processors 12 and/or the one or more not shown chipsets). Also alternatively, one or more host processors 12, memory 21, the one or more not shown chipsets, and/or some or all of the functionality and/or components thereof may be comprised in, for example, circuitry 118 and/or CC 75. Many other alternatives are possible without departing from this embodiment.

Depending upon, for example, the particular embodiment, host 20 may comprise, in whole or in part, respective components and/or functionality of host 10. However, as is described below, alternatively or additionally, host 20 may comprise, at least in part, respective components and/or functionality that may differ, at least in part, from respective components and/or functionality of host 10. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, and/or memory. Although not shown in the Figures, host computer 10 and/or host computer 20 each may comprise a respective graphical user interface system. The not shown respective graphical user interface systems may comprise, e.g., respective keyboards, pointing devices, and display systems that may permit one or more human users to input commands to, and monitor the operation of, host computer 10, node 20, and/or system 100.

One or more machine-readable program instructions may be stored in computer-readable/writable memory 21. In operation of host computer 10, these instructions may be accessed and executed by one or more host processors 12 and/or circuitry 118. When executed by one or more host processors 12 and/or circuitry 118, these one or more instructions may result in one or more operating systems (OS) 32 and/or one or more processes 124 being executed at least in part by one or more host processors 12 and/or NCC 118 and becoming resident at least in part in memory 21. Also when executed by one or more host processors 12 and/or circuitry 118, these one or more instructions may result in one or more host processors 12, circuitry 118, OS 32, and/or one or more processes 124, performing the operations described herein as being performed by these components of system 100. In this embodiment, a portion of an entity may comprise all or less than all of the entity. Also, in this embodiment, a process, program, driver, operating system, and application may be used interchangeably, and may comprise and/or result at least in part from execution of one or more program instructions. Although not shown in the Figures, one or more processes 124 may be comprised, at least in part, in OS 32, or vice versa. Also in this embodiment, memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

NCC 118 may exchange data and/or commands via one or more networks 50 in accordance with one or more communication protocols. For example, in this embodiment, these one or more protocols may be compatible with, e.g., an Ethernet protocol and/or Transmission Control Protocol/Internet Protocol (TCP/IP) protocol.

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP protocol that may be utilized in system 100 may comply or be compatible with the protocols described in Internet Engineering Task Force (IETF) Request For Comments (RFC) 791 and 793, published September 1981.

In this embodiment, in operation, ports 120A, 120B, . . . 120N may exchange data and/or commands with other entities (e.g., host computer 20) via one or more networks 50. This exchange may consume, at least in part, the respective communication bandwidth (BW) and/or communication bandwidth capabilities of these ports. For example, in operation, one or more ports 120A may experience bandwidth condition (BWC) 130, and later, may experience BWC 136. BWC 130 may involve consumption of a relatively higher amount of communication bandwidth of one or more ports 120A than BWC 136 does. In this embodiment, a bandwidth condition may be, comprise, involve, relate to, refer to, reflect, indicate, and/or implicate, at least in part, state, status, usage, and/or consumption of bandwidth. Also in this embodiment, bandwidth and communication bandwidth may be used interchangeably, and may be, comprise, involve, relate to, refer to, reflect, indicate, and/or implicate, at least in part, communication capability, throughput, rate, and/or amount of communication.

Also in operation, not all of the ports 120A, 120B, . . . 120N may be contemporaneously actively transmitting and/or receiving data and/or commands via one or more networks 50. For example, in this embodiment, one or more ports 120A may be actively involved in transmitting and/or receiving data and/or commands via one or more networks 50, while contemporaneously, one or more ports 120B and/or one or more ports 120N may not be actively involved in transmitting and/or receiving data and/or commands via one or more networks 50. Accordingly, in this example, one or more ports 120A may be in a fully operational and powered up state, while contemporaneously, one or more ports 120B and/or one or more ports 120N may be in relatively lower power state. While in this relatively lower power state, one or more respective components and/or functionalities of one or more ports 120B and/or one or more ports 120N may be de-energized, inactive, in a sleep mode, and/or powered down to reduce power consumption (e.g., compared to when the one or more respective components and/or functionalities are fully powered up when one or more ports 120B and/or 120N are in the fully operational and powered up state).

Figure 5:
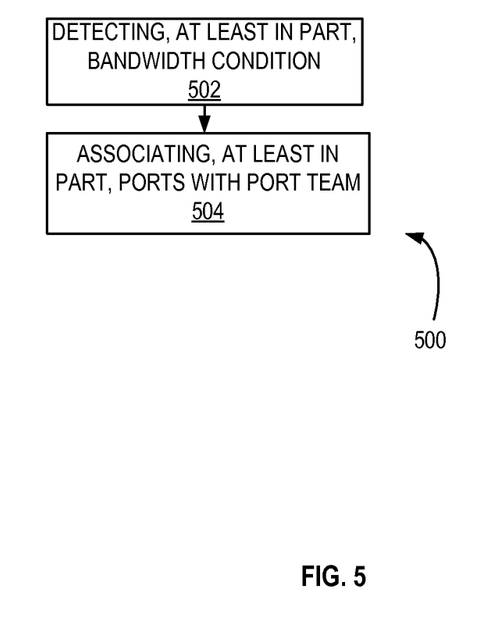
FIG. 5 illustrates operations in an embodiment.

Reference now is being specifically made to FIGS. 1 and 5. FIG. 5 illustrates operations 500 that may be performed in system 100. In the operation of this embodiment, one or more processes 124 may detect, at least in part, bandwidth condition 130 of one or more ports 120A, as illustrated by operation 502 in FIG. 5. In response, at least in part, to the detection, at least in part, of bandwidth condition 130 by one or more processes 124, one or more processes 124 may associate, at least in part, one or more ports 120A and one or more other ports (e.g., one or more ports 120N) with a port team (PT) 132 (see operation 504 in FIG. 5). In an embodiment, a port team may comprise one or more associations of, at least, a first port and a second port, such as, for example, for one or more purposes, such as, without limitation, bandwidth, link, and/or communication aggregation and/or pooling, fault tolerance, load balancing, and/or other purposes. In an embodiment, a port may comprise circuitry capable of being used, at least in part, to facilitate, at least in part, and/or implement, at least in part, physically and/or logically, at least in part, communicative coupling of at least one entity to at least one other entity and/or to interface, at least in part, at least one entity to at least one other entity. In an embodiment, port team 132 may be in accordance and/or compatible with, at least in part, IEEE Standard for Local and Metropolitan Area Networks—Link Aggregation, IEEE Std. 802.1AX-2008, copyright 2008.

For example, in this embodiment, bandwidth condition 130 may be characterized as being at or near (e.g., within a predetermined threshold of) a maximum possible bandwidth (e.g., in this example, line rate) that one or more ports 130 may be capable of achieving during a predetermined time period. Also, contemporaneously, at least in part, with execution of operation 502, one or more ports 120B and/or 120N may not be actively involved in transmitting and/or receiving data and/or commands via one or more networks 50, and therefore, may be in a relatively lower power state compared to the fully operational/powered up state in which one or more ports 120A may be operating. Therefore, prior to being associated, at least in part, by one or more processes 124 with port team 132, one or more ports 120N may be in this relatively lower power state.

However, after (and/or in response to) being associated, at least in part, by one or more processes 124 with port team 132, one or more ports 120N may enter and operate, at least in part, in a relatively higher power state (e.g., fully operational/powered up state). In this relatively higher power state of operation of one or more ports 120N while one or more ports 120N are associated, at least in part, in port team 132, communications between host 10 and one or more networks 50 may be carried out such that one or more ports 120A and one or more ports 120N are used, a least in part, to provide a common respective communication channel via which the respective bandwidth of one or more ports 120N may be pooled with the respective bandwidth of one or more ports 120A. Advantageously, this common communication channel may have a maximum effective bandwidth that may be equal to the sum of the respective maximum possible bandwidths of one or more ports 120A and one or more ports 120N. Also advantageously, by associating, at least in part, one or more ports 120A and one or more ports 120N in port team 132, in this manner, redundancy and/or failover features may be provided in system 100 with respect to one or more ports 120A and/or one or more 120N. The particular parameters of which of the ports 120A, 120B, . . . 120N may be part of and/or associated with, at least in part, one or more port teams, the circumstances under which such association may take place, and/or the functionality and/or operational characteristics of the one or more port teams, may be specified, at least in part, by a human operator of node 10 and/or node 20 via, e.g., one or more not shown virtualization and/or management tools via one or more not shown user interfaces.

Figure 2:
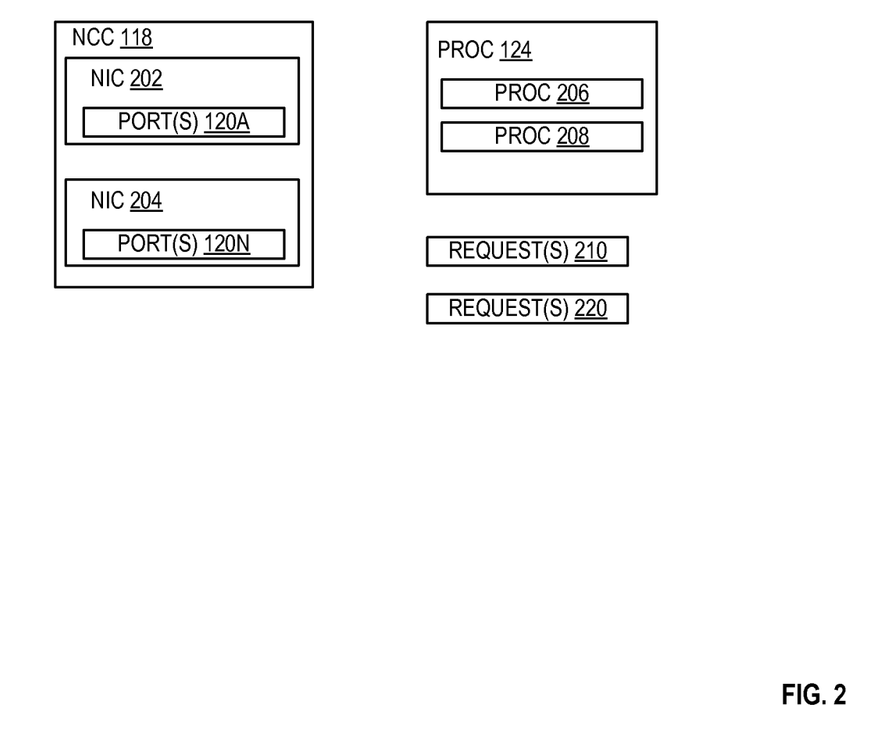
FIG. 2 illustrates elements of a system embodiment.

With reference to FIG. 2, NCC 118 may comprise network interface controller (NIC) 202 and NIC 204. NIC 202 may comprise one or more ports 120A, and NIC 204 may comprise one or more ports 120N. One or more processes 124 may comprise one or more driver instances/processes 206 and one or more driver instances/processes 208. One or more processes 206 may be associated, at least in part, with one or more ports 120A. One or more processes 208 may be associated, at least in part, with one or more ports 120N.

In this embodiment, as part of operation 502, one or more processes 206 may detect, at least in part, bandwidth condition 130 of one or more ports 120A. As part of operation 504, in response at least in part to the detection, at least in part, of bandwidth condition 130, one or more processes 206 may generate and issue, at least in part, one or more requests 210 and/or one or more requests 220 to one or more processes 208. As is described below, one or more requests 210 and/or 220 may result, at least in part, in (1) one or more ports 120A and/or one or more ports 120N being associated, at least in part, in port team 132, and (2) one or more ports 120N entering (and operating in) the relatively higher power state from the relatively lower power state.

Figure 3:
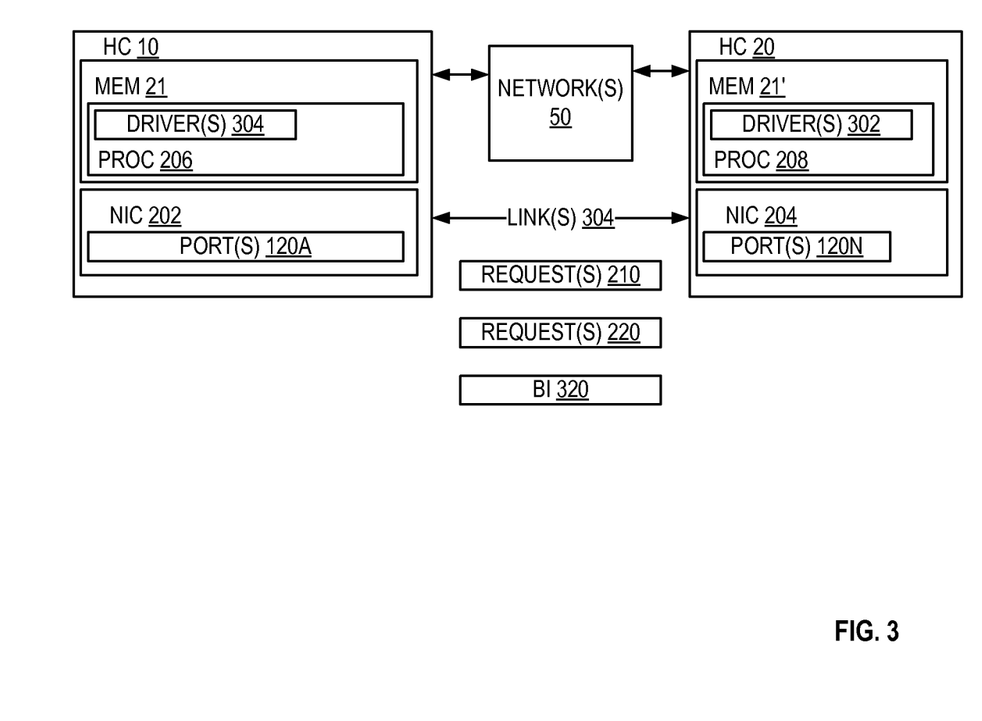
FIG. 3 illustrates elements of a system embodiment.

For example, as shown in FIG. 3, in an embodiment, host 10 may comprise, at least in part, NIC 202 and memory 21. Also, for example, in this embodiment, host 20 may comprise NIC 204 and memory 21'. NIC 202 may comprise, at least in part, one or more ports 120A. NIC 204 may comprise, at least in part, one or more ports 120N. NIC 202 may be communicatively coupled to NIC 204 via one or more dedicated communication links 304 that may be distinct, at least in part, from one or more networks 50. One or more networks 50 also may communicatively couple NIC 202 to NIC 204. The construction and/or operation of memory 21' may be, at least in part, similar or identical to the construction and/or operation of memory 21. One or more processes 206 may reside, at least in part, in memory 21. One or more processes 208 may reside, at least in part, in memory 21'. One or more processes 206 may comprise, at least in part, one or more port driver instances/processes 304. One or more processes 206 and/or one or more drivers 304 may be associated, at least in part, with one or more ports 120A. One or more processes 208 may comprise, at least in part, one or more port driver instances/processes 302. One or more processes 208 and/or one or more drivers 302 may be associated, at least in part, with one or more ports 120N. One or more processes 206 may comprise one or more intermediate drivers/processes associated with, for example, multiple respective ports in NIC 202, and one or more drivers 304 may comprise one or more direct/physical drivers associated with single respective ports of NIC 202. Additionally, one or more processes 208 may comprise one or more intermediate drivers/processes associated with, for example, multiple respective ports in NIC 204, and one or more drivers 302 may comprise one or more direct/physical drivers associated with single respective ports of NIC 204.

In this embodiment, as part of operation 502, one or more processes 206 may detect, at least in part, bandwidth condition 130. In response, at least in part, to the detection, at least in part, by one or more processes 206 of bandwidth condition 130, one or more processes 206 may generate and issue, at least in part, via one or more links 304, as part of operation 504, one or more requests 210 to one or more processes 208.

One or more 210 may request, at least in part, that (1) one or more processes 208 provide one or more ports 120A with additional bandwidth, and (2) one or more processes 208 provide one or more processes 206 with respective bandwidth information (BI) 320 concerning the ports (e.g., one or more ports 120N) with which one or more processes 208 may be associated. The respective BI 320 may comprise, e.g., maximum possible bandwidth, current line rate, bandwidth capabilities, etc., of and/or associated, at least in part, with the one or more ports 120N.

In response, at least in part, to one or more requests 210, one or more processes 208 may request that one or more drivers 302 provide one or more processes 208 with the respective BI 320. In response, one or more drivers 302 may provide the respective BI 320 to one or more processes 208. One or more processes 208 may provide BI 320 to one or more processes 206 via one or more links 304.

One or more processes 206 may determine, at least in part, based at least in part upon BI 320, whether one or more respective ports (e.g., one or more ports 120N) with which one or more processes 208 may be associated, has available bandwidth that may be used in constructing port team 132. As part of operation 504, one or more processes 206 may determine, at least in part, that one or more ports 120N may have such available bandwidth, and may associate, at least in part, one or more ports 120A and one or more ports 120N in port team 132, depending upon and up to the maximum expected amount of bandwidth expected to be required by the common channel to result from the port team 132. Also as part of operation 504, one or more processes 206 may generate and issue, at least in part, one or more requests 220 to one or more processes 208. One or more requests 220 may request, at least in part, that one or more ports 120N become associated, at least in part, with one or more ports 120A in port team 132. In the manner requested, at least in part, by one or more requests 220, one or more processes 208 (1) may associate, at least in part, one or more ports 120N with one or more ports 120A in port team 132, and (2) may request, at least in part, that one or more drivers 302 cause one or more ports 120N to enter (and operate in) the relatively higher power state from the relatively lower power state. One or more drivers 302 may cause one or more ports 120N to enter (and operate in) the relatively higher power state, and one or more ports 120N may become associated with one or more ports 120A in port team 132. Thereafter, while one or more ports 120N are associated with port team 132, data and/or commands transmitted by one or more ports 120N may be first transmitted, at least in part, via one or more links 304 to host 20. Also, while one or more ports 120N are associated with port team 132, data and/or commands received by one or more ports 120N may be subsequently transmitted, at least in part, via one or more links 304 to host 10.

Alternatively, without departing from this embodiment, NIC 202, NIC 204, one or more ports 120A, one or more ports 120N, one or more processes 206, and/or one or more processes 208 may be comprised and/or reside, at least in part, in a single host (e.g., host 10). In this alternate arrangement, one or more links 304 may be eliminated, and the operations of and/or communications among these various components may be carried out within the single host 10.

Figure 4:
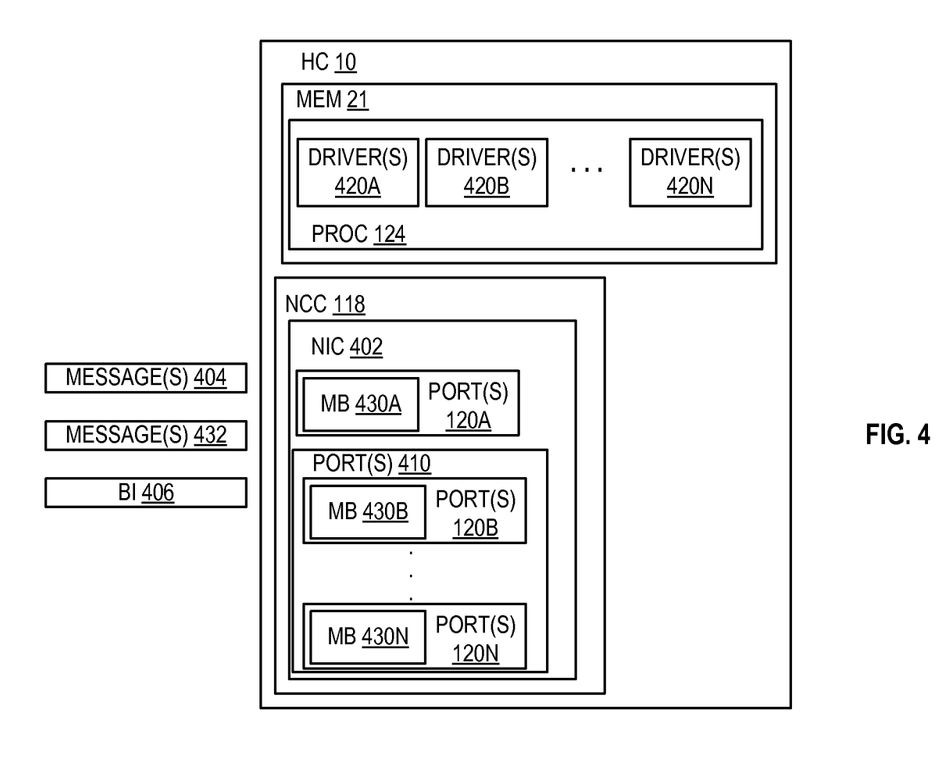
FIG. 4 illustrates elements of a system embodiment.

Alternatively or additionally, without departing from this embodiment, each of the ports 120A, 120B, ... 120N may comprise and/or be associated with, at least in part, a respective mailbox. These mailboxes may be used to facilitate, at least in part, communication (e.g., of messages, requests, etc.) among the respective drivers/processes that are associated with the respective ports. In an embodiment, the terms "message," "request," "command," and "packet" may be used interchangeably, and may mean one or more symbols and/or values. Also in this embodiment, one or more processes 124 may be or comprise, at least in part, one or more respective driver instances/processes that may be respectively associated with, at least in part, respective ports 120A, 120B, ... 120N. For example, in an embodiment, as shown in FIG. 4, NCC 118 may comprise NIC 402. NIC 402 may comprise one or more ports 120A, 120B, ... 120N. One or more ports 120A may comprise and/or be associated with, at least in part, one or more mailboxes (MB) 430A. One or more ports 120B may comprise and/or be associated with, at least in part, one or more MB 430B. One or more ports 120N may comprise and/or be associated with, at least in part, one or more MB 430N. One or more processes 124 may comprise one or more drivers/processes 420A, 420B, ... 420N that may be executed, at least in part, by one or more host processors 12 and/or NCC 118, and resident, at least in part, in memory 21. One or more processes 420A, 420B, ... 420N may be respectively associated with, at least in part, one or more ports 120A, 120B, ... 120N. The respective processes 420A, 420B, ... 420N may communicate, at least in part, among themselves via the respective mailboxes 430A, 430B, ... 430N.

In this embodiment, as part of operation 502, one or more processes 420A may detect, at least in part, bandwidth condition 130. In response, at least in part, to the detection, at least in part, by one or more processes 420A of bandwidth condition 130, one or more processes 420A may generate and issue, at least in part, as part of operation 504, one or more messages 404 to one or more respective mailboxes (e.g., mailboxes 430B ... 430N) that may be associated with one or more respective ports (e.g., ports 120B ... 120N) 410 other than the one or more ports 120A with which one or more processes 420A may be associated. This may result, at least in part, in the interrupting of these other respective ports 120B ... 120N and/or their associated processes 420B ... 420N. In response, these associated processes 420B ... 420N may examine one or more messages 404 in their respective mailboxes 430B ... 430N. One or more values (e.g., one or more not shown register values or portions thereof) in the mailboxes 430B ... 430N may indicate the one or more ports 120A associated with the one or more processes 420A that sent the one or more messages 404.

One or more messages 404 may request, at least in part, that (1) one or more ports 120A be provided with additional bandwidth, and (2) each of these one or more other ports 410 provide their respective bandwidth information (BI) 406 to one or more ports 120A and/or one or more processes 420A. The respective BI 406 may comprise, e.g., maximum possible bandwidth, current line rate, bandwidth capabilities, etc., of and/or associated, at least in part, with the one or more other respective ports 410.

In response, at least in part, to one or more messages 404, each of the one or more processes 420B ... 420N associated with the one or more other ports 410 may generate and issue, at least in part, the respective BI 406 to one or more MB 430A. This may result in one or ports 120A being interrupted. In response, one or more processes 420A may examine the respective BI 406 to determine, at least in part, whether one or more respective ports (e.g., one or more ports 120B and/or one or more ports 120N) comprised in one or more ports 410 has available bandwidth that may be used in constructing port team 132. As part of operation 504, one or more processes 420A may determine, at least in part, one or more ports 120B and/or one or more ports 120N that may have such available bandwidth, and may associate, at least in part, one or more ports 120A and one or more ports 120N (and/or one or more ports 120B) in port team 132, depending upon and up to the maximum expected amount of bandwidth expected to be required by the common channel to result from the port team. Also as part of operation 504, one or more processes 420A may generate and issue, at least in part, one or more messages 432 to one or more MB 430B and/or 430N. One or more messages 432 may request, at least in part, that one or more ports 120B and/or 120N become associated, at least in part, with one or more ports 120A in port team 132. In the manner requested, at least in part, by one or more messages 432, one or more processes 420B and/or 420N (1) may associate, at least in part, one or more ports 120B and/or 120N with one or more ports 120A in port team 132, and (2) may cause, at least in part, one or more ports 120B and/or 120N to enter (and operate in) the relatively higher power state from the relatively lower power state.

Returning now to FIG. 1, in an embodiment, after one or more ports 120A and one or more ports 120N have been associated, at least in part, as a result of operation 504, with port team 132, one or more ports 120A may experience bandwidth condition 136. In this embodiment, bandwidth condition 136 may be sufficiently reduced (e.g., compared to bandwidth condition 130) that it is no longer desirable to pool additional bandwidth from one or more other ports (e.g., one or more ports 120N) with the bandwidth of one or more ports 120A. One or more processes 124 may detect, at least in part, this bandwidth condition 136 of one or more ports 120A. In response, at least in part, to this, one or more processes 124 may no longer associate, at least in part, one or more ports 120A and/or 120N with port team 132. Thereafter, one or more ports 120N may enter the relatively lower power state from the relatively higher power state. In this embodiment, depending upon the particular configuration, communication between ports 120A and 120N and/or one or more respective processes 124, in order to bring about the disassociation of ports 120A and/or 120N from port team 132, and/or in order to bring about the entry of one or more ports 120N into the relatively lower power state from the relatively higher power state, may be carried out in accordance with a variety of techniques, including those described in connection with the configurations illustrated in FIGS. 1 to 5. Likewise, in this embodiment, depending upon the particular configuration, the construction and/or operation of NCC 118 may be in accordance with any construction and/or operation thereof illustrated and/or described in connection with FIGS. 1 to 5.

Thus, an embodiment may include circuitry to be comprised at least in part in a first host. The circuitry may execute, at least in part, at least one process. The circuitry may comprise a first port and a second port. The at least one process may detect, at least in part, a first bandwidth condition of the first port, and may associate, at least in part, in response at least in part to the first bandwidth condition, the first port and the second port with a port team. The second port may have been, prior to being associated, at least in part, with the port team, in a relatively lower power state compared to a relatively higher power state. The second port may be in the relatively higher power state after the second port is associated, at least in part, with the port team.

Advantageously, this embodiment may permit the dynamic association and/or de-association of ports into and out of, respectively, a teaming relationship, without requiring elevated levels of human user involvement in establishing and terminating such relationship. Advantageously, this permits this embodiment to exhibit improved adaptability to changing network conditions without requiring such elevated levels of human involvement. Also advantageously, this decreases the time and expense involved in maintaining and operating this embodiment. Further advantageously, by coupling this improved adaptability with the dynamic management of port power states in this embodiment, this may permit this embodiment to offer improved efficiency and decreased power consumption.

What is claimed is:

1. An apparatus comprising:
   circuitry to be comprised at least in part in a first host, the circuitry comprising a first port and a second port, the circuitry to execute, at least in part, at least one process, the at least one process to detect, at least in part, a first bandwidth condition of the first port, the at least one process to issue one or more messages to one or more mailboxes associated with the second port, in response at least in part to the first bandwidth condition, the one or more messages being to request provision of bandwidth information of the second port, the at least one process to issue one or more other messages to the one or more mailboxes to request that the first port and the second port become associated, at least in part, with each other in a port team, the second port to be in a relatively lower power state prior to being associated, at least in part, with the first port in the port team, the relatively lower power state being relative to a relatively higher power state that the second port is to be in, in response to being associated, at least in part, with the first port, the relatively lower power state comprising a sleep mode state of the second port.

2. The apparatus of claim 1, wherein:
   the circuitry comprises a first network interface controller and a second network interface controller;
   the first network interface controller comprises the first port;
   the second network interface controller comprises the second port;
   the at least one process comprises at least one first process and at least one second process; and
   the at least one first process is to detect the first bandwidth condition and to issue, in response at least in part to the first bandwidth condition, at least one request to the at least one second process that results, at least in part, in the first port and the second port being associated in the port team, the at least one request also resulting, at least in part, in the second port entering the relatively higher power state from the relatively lower power state.

3. The apparatus of claim 2, wherein:
   the first host comprises the first network interface controller;
   a second host comprises the second network interface controller;
   the at least one second process comprises a first port driver associated with the second port, the first port driver residing, at least in part, in the second host; and
   the apparatus further comprises at least one communication link communicatively coupling the first host and the second host, the at least one request to be communicated, at least in part, via the at least one communication link.

4. The apparatus of claim 1, wherein:
   the circuitry comprises a network interface controller that comprises both the first port and the second port, the network interface controller to be comprised in the first host;
   the at least one process is to issue, at least in part, in response at least in part to the first bandwidth condition, at least one message to request that the at least one process be provided, at least in part, with the bandwidth information associated with at least one port, the at least one port comprising the second port; and
   the at least one process is to associate, at least in part, the first port and the second port with the port team, based at least in part upon the bandwidth information.

5. The apparatus of claim 1, wherein:
   after the first port and the second port have been associated, at least in part, in the port team, the at least one process is to detect, at least in part, a second bandwidth condition of the first port;
   in response, at least in part, to the second bandwidth condition, the at least one process is no longer to associate, at least in part, the second port with the port team; and
   after the second port is no longer associated, at least in part, with the port team, the second port is to enter the relatively lower power state from the relatively higher power state.

6. The apparatus of claim 1, wherein:
   the circuitry is comprised, at least in part, in a circuit card that is to be coupled to a circuit board in the first host;
   the circuitry comprises a third port; and
   based at least in part upon bandwidth information associated with the third port, the at least one process is also to associate, at least in part, the third port with the port team.

7. A method comprising:
   detecting, at least in part, a first bandwidth condition of a first port by at least one process, the at least one process to be executed, at least in part, by circuitry to be comprised at least in part in a first host, the first port and a second port being comprised in the circuitry; and
   issuing, at least in part, by the at least one process, in response at least in part to the first bandwidth condition, one or more messages to one or more mailboxes associated with the second port, the one or more messages being to request provision of bandwidth information of the second port, the at least one process to issue one or more other messages to the one or more mailboxes to request that the first port and the second port become associated, at least in part, with each other in a port team, the second port to be in a relatively lower power state prior to being associated, at least in part, with the first port in the port team, the relatively lower power state being relative to a relatively higher power state that the second port is to be in, in response to being associated, at least in part, with the first port, the relatively lower power state comprising a sleep mode state of the second port.

8. The method of claim 7, wherein:
the circuitry comprises a first network interface controller and a second network interface controller;
the first network interface controller comprises the first port;
the second network interface controller comprises the second port;
the at least one process comprises at least one first process and at least one second process; and
the at least one first process is to detect the first bandwidth condition and to issue, in response at least in part to the first bandwidth condition, at least one request to the at least one second process that results, at least in part, in the first port and the second port being associated in the port team, the at least one request also resulting, at least in part, in the second port entering the relatively higher power state from the relatively lower power state.

9. The method of claim 8, wherein:
the first host comprises the first network interface controller;
a second host comprises the second network interface controller;
the at least one second process comprises a first port driver associated with the second port, the first port driver residing, at least in part, in the second host; and
at least one communication link communicatively couples the first host and the second host, the at least one request to be communicated, at least in part, via the at least one communication link.

10. The method of claim 7, wherein:
the circuitry comprises a network interface controller that comprises both the first port and the second port, the network interface controller to be comprised in the first host;
the at least one process is to issue, at least in part, in response at least in part to the first bandwidth condition, at least one message to request that the at least one process be provided, at least in part, with the bandwidth information associated with at least one port, the at least one port comprising the second port; and
the at least one process is to associate, at least in part, the first port and the second port with the port team, based at least in part upon the bandwidth information.

11. The method of claim 7, wherein:
after the first port and the second port have been associated, at least in part, in the port team, the at least one process is to detect, at least in part, a second bandwidth condition of the first port;
in response, at least in part, to the second bandwidth condition, the at least one process is no longer to associate, at least in part, the second port with the port team; and
after the second port is no longer associated, at least in part, with the port team, the second port is to enter the relatively lower power state from the relatively higher power state.

12. The method of claim 7, wherein:
the circuitry is comprised, at least in part, in a circuit card that is to be coupled to a circuit board in the first host;
the circuitry comprises a third port; and
based at least in part upon bandwidth information associated with the third port, the at least one process is also to associate, at least in part, the third port with the port team.

13. Computer-readable memory storing one or more instructions that when executed by a machine result in performance of operations comprising:
detecting, at least in part, a first bandwidth condition of a first port by at least one process, the at least one process to be executed, at least in part, by circuitry to be comprised at least in part in a first host, the first port and a second port being comprised in the circuitry; and
issuing, at least in part, by the at least one process, in response at least in part to the first bandwidth condition, one or more messages to one or more mailboxes associated with the second port, the one or more messages being to request provision of bandwidth information of the second port, the at least one process to issue one or more other messages to the one or more mailboxes to request that the first port and the second port become associated, at least in part, with each other in a port team, the second port to be in a relatively lower power state prior to being associated, at least in part, with the first port in the port team, the relatively lower power state being relative to a relatively higher power state that the second port is to be in, in response to being associated, at least in part, with the first port, the relatively lower power state comprising a sleep mode state of the second port.

14. The memory of claim 13, wherein:
the circuitry comprises a first network interface controller and a second network interface controller;
the first network interface controller comprises the first port;
the second network interface controller comprises the second port;
the at least one process comprises at least one first process and at least one second process; and
the at least one first process is to detect the first bandwidth condition and to issue, in response at least in part to the first bandwidth condition, at least one request to the at least one second process that results, at least in part, in the first port and the second port being associated in the port team, the at least one request also resulting, at least in part, in the second port entering the relatively higher power state from the relatively lower power state.

15. The memory of claim 14, wherein:
the first host comprises the first network interface controller;
a second host comprises the second network interface controller;
the at least one second process comprises a first port driver associated with the second port, the first port driver residing, at least in part, in the second host; and
at least one communication link communicatively couples the first host and the second host, the at least one request to be communicated, at least in part, via the at least one communication link.

16. The memory of claim 13, wherein:
the circuitry comprises a network interface controller that comprises both the first port and the second port, the network interface controller to be comprised in the first host;
the at least one process is to issue, at least in part, in response at least in part to the first bandwidth condition, at least one message to request that the at least one process be provided, at least in part, with the bandwidth information associated with at least one port, the at least one port comprising the second port; and the at least one process is to associate, at least in part, the first port and the second port with the port team, based at least in part upon the bandwidth information.

17. The memory of claim 13, wherein:
after the first port and the second port have been associated, at least in part, in the port team, the at least one process is to detect, at least in part, a second bandwidth condition of the first port;
in response, at least in part, to the second bandwidth condition, the at least one process is no longer to associate, at least in part, the second port with the port team; and
after the second port is no longer associated, at least in part, with the port team, the second port is to enter the relatively lower power state from the relatively higher power state.

18. The memory of claim 13, wherein:
the circuitry is comprised, at least in part, in a circuit card that is to be coupled to a circuit board in the first host;
the circuitry comprises a third port; and
based at least in part upon bandwidth information associated with the third port, the at least one process is also to associate, at least in part, the third port with the port team.

19. The apparatus of claim 1, wherein:
the circuitry comprises at least one of input/output controller circuitry and network controller circuitry; and
the port team being to permit at least one of bandwidth aggregation, link aggregation, communication aggregation, fault tolerance, and load balancing.

20. The apparatus of claim 1, wherein:
the at least one process is to request that the second port enter the relatively higher power state from the relatively lower power state.

* * * * *